UNITED STATES PATENT OFFICE.

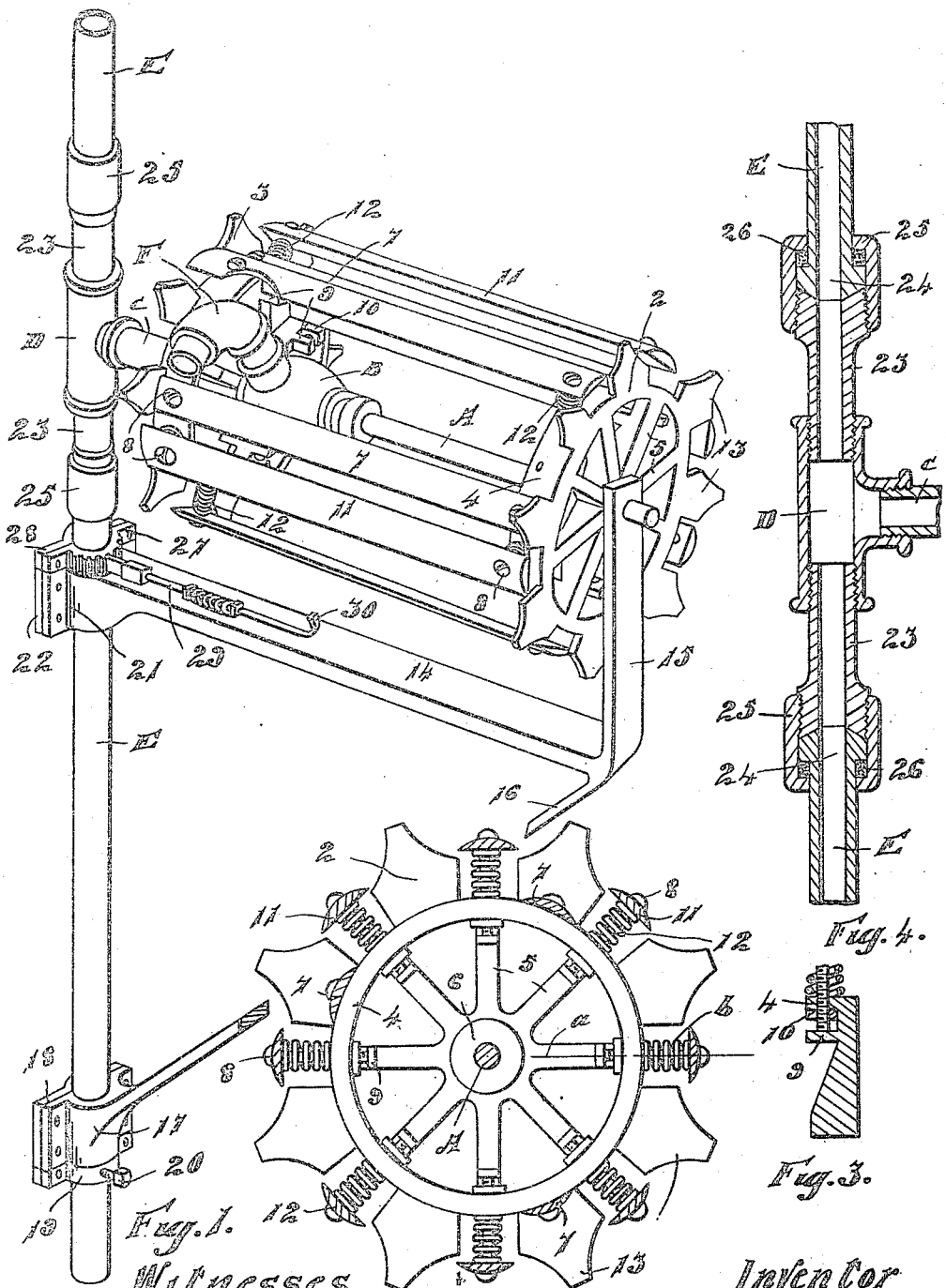

BEAUCHAMP HENRY MONTGOMERY, OF TORONTO, ONTARIO, CANADA.

HOSE-REEL.

994,025.     Specification of Letters Patent.     Patented May 30, 1911.

Application filed July 11, 1910. Serial No. 571,495.

*To all whom it may concern:*

Be it known that I, BEAUCHAMP HENRY MONTGOMERY, a subject of the King of Great Britain, residing at 270 Avenue road, city of Toronto, in the county of York, Province of Ontario, Canada, have invented certain new and useful Improvements in Hose-Reels, of which the following is a specification.

My invention relates to improvements in hose reels, more particularly designed for indoor use, though not essentially confined to being so used, and one of the objects of my invention is to simplify and cheapen the construction of this class of apparatus.

Another object of my invention is to mount my hose reel in connection with the stand pipe in such a manner that it may be horizontally turned to occupy any desired angle in relation thereto, and locked in position, and the construction of my invention will be hereinafter particularly set forth and the parts I claim as new will be pointed out in the claims forming part of this specification.

Figure 1 is a perspective view of my hose reel, showing the same attached to any ordinary stand pipe. This view also shows the preferred means for locking the hose reel at the desired angle in respect of the said stand pipe. Fig. 2 is a vertical cross section on an enlarged scale, through my hose reel. Fig. 3 is in part a longitudinal section on the line *a—b*, Fig. 2, and Fig. 4 is a longitudinal section through part of the stand pipe showing means whereby the hose reel is connected thereto, and further showing means whereby the hose reel may be moved into various positions.

In the drawings, like characters of reference indicate corresponding parts in each figure.

The spindle for the reel consists of a rod A which is suitably combined with the union B, which union is connected by its coupling C, to the coupling D carried by the stand pipe E. The coupling C is incapable of axial movement, while the union B is mounted after any well known manner so that it will revolve freely with the hose reel, and is so constructed that when the water is turned on no matter in what position the union may be in, it will freely pass into the hose (not shown) attached to the end of the coupling F carried by the union B. The parts described are old and well known and I lay no claim thereto specifically. The hose reel consists of two spiders 2 and 3 which are respectively mounted on the rod A and coupling C, after any suitable construction. Each spider is integrally formed, and comprises an inwardly projecting flange 4 which is connected by the spokes 5 with the hub 6. 7 are bars resting on the flanges 4 and secured thereto preferably by screws, and by means of which the said spiders are firmly connected together. Radiating from the longitudinal axis of the reel are a plurality of threaded pins 8 which screw through the flanges 4 until their lower ends abut the lugs 9 integrally formed with the spokes 5. These lugs 9 positively limit the inward movement of the pins 8. As each threaded pin is screwed through its lug 9 a nut 10 is placed thereon and when the pin abuts its lug, the said nut is screwed against the inner side of its adjacent flange 4 and so locks its threaded pin.

11 are a plurality of bars mounted on the pins 8 near their outer ends and held by the coiled springs 12 in the position shown in Figs. 1 and 2. By means of the coiled springs 12, any pressure exerted by the hose against the bars 11 will cause the various springs 12 to compress and so relieve the hose of any undue strain. Integrally formed with each flange 4 are a plurality of flange sections 13 spaced apart as shown and which project beyond the bars 11 and provide means whereby the coils of the hose (not shown) are prevented from longitudinal displacement on the hose reel.

The pins 8 are preferably positioned in respect of the flange sections 13 so that the bars 11 will be positioned opposite the space between two of the said flange sections. The hose is of course attached to the coupling F and wound around the bars 11.

In order to enable my hose reel to be turned in different directions, I mount the same in a suitable bracket carried by the stand pipe E. My preferred form of bracket for this purpose consists of a horizontal arm 14 with which is integrally formed a standard 15 in which the outward end of the rod A has its bearing. 16 is a strut integrally formed with the arm 14 and standard 15. A clamp member 17 is integrally formed with the lower end of the strut 16, and the same is suitably secured to a clamp member 18. These clamp members embrace the stand pipe E. 19 is a clamp positioned underneath the clamp members 17 and 18 and secured to the stand pipe E by a set screw 20. The clamp 19 supports the said bracket on the stand pipe E. Integrally formed with the horizontal arm 14 is a clamp member 21, with which the clamp member 22 forms means by which the inner end of the said horizontal arm is supported by the stand pipe E. The means just described for attaching the bracket to the stand pipe permit the free movement of this bracket so that the position of the hose reel may be changed at will.

A coupling D is connected with the stand pipe E in such a manner as to permit the hose reel to be swung in any horizontal direction; the construction for this purpose consists in providing the said coupling D at each end with an extension 23 the outer end of each of which is preferably cup-shaped as shown so as to receive the inner end of the pipes 24.

25 is a coupling receiving the ends of the extensions 23 and the pipes 24, and 26 is any suitable packing. The extensions 23 are threaded into the couplings 25 and from the construction illustrated in figure 4, it will be understood that the hose reel may be moved into any horizontal position. Any suitable means may be provided for holding the hose reel in the desired position; my preferred means for this purpose consists of a toothed clamp member 27, and its complementary member 28, which are clamped together and tightly embrace the stand pipe E.

29 is a spring-controlled bolt with a finger piece 30. Now by disengaging this bolt from the teeth of the clamp member 27, it will be understood that the hose reel may be moved into the desired position and locked therein by replacing the bolt, thereby locking the said reel in position so that the hose may be readily reeled therefrom. Some suitable means for locking the hose reel in the desired position will be necessary, as will be understood, otherwise when strain is exerted against the hose to unwind it this would change the position of the hose reel and render this operation difficult.

While I have described what I consider to be the best embodiment of my invention, I desire it to be understood that I do not confine myself to the exact construction shown and described, except in so far as that may be rendered necessary by the prior state of the art, and the terms of my claims.

What I claim as my invention is:

1. A hose reel comprising a spindle provided with a union to which the hose is designed to be attached; a spider mounted at each end of the said spindle each integrally formed and each provided with an inwardly extending horizontal flange; bars carried by said flanges, and securing said spiders together; a plurality of spring-controlled bars carried by said spiders and positioned beyond said flanges and around which the hose is wound, and a plurality of flange sections, integrally formed with said spiders and projecting beyond the outer surface of said spring-controlled bars.

2. A hose reel comprising a spindle provided with a union to which the hose is designed to be attached; a spider mounted at each end of the said spindle each integrally formed and each provided with an inwardly extending horizontal flange, and further provided with a plurality of lugs spaced apart from said flanges; bars carried by said flanges and securing said spiders together; a plurality of threaded pins screwing through said flanges and resting against said lugs; a nut threaded on each of the said threaded pins and jammed against the inner side of its associated flange; a bar through each end of which passes a threaded pin carried by the said spiders; a coiled spring mounted on each threaded pin and positioned between said bars and said flanges, and a flange section integrally formed with each of the said spiders, as and for the purpose specified.

3. As a new article of manufacture, a member for a hose reel integrally provided with a horizontal inward-projecting flange; a plurality of lugs integrally formed with said member and spaced apart from the inner surface of said flange, and a plurality of radiating flange sections integrally formed with said member and spaced apart and projecting beyond the periphery of said flange.

4. The combination with a stand-pipe, and a movable union therein, of a horizontally-disposed reel-spindle provided at one end with a union connected with said movable union so that said spindle will, when the reel thereon is horizontally moved, describe an arc with the said stand pipe as a center; a reel mounted to rotate on said spindle with the union therefor, and means for locking the said reel and its spindle in the desired position.

5. The combination with a stand-pipe, and a movable union therein, of a horizontally-disposed reel-spindle provided at one end with a union connected with said movable union so that said spindle will, when the reel thereon is horizontally moved, describe an arc with the said stand pipe as a center; a reel mounted to rotate on said spindle with the union therefor; means for locking the said reel and its spindle in the desired position, and a movable bracket supported by said stand-pipe and in which the outer end of said reel-spindle has its bearing.

6. The combination with a stand-pipe and a movable union therein, of a horizontally-disposed reel-spindle provided at one end with a union connected with said movable union so that said spindle will, when the reel thereon is horizontally moved, describe an arc with the said stand-pipe as a center; a reel mounted to rotate on said spindle with the union therefor; means for locking the said reel and its spindle in the desired position; a movable bracket supported by said stand-pipe and in which the outer end of said reel-spindle has its bearing, and means for locking said bracket and reel in the desired position.

7. The combination with a stand-pipe, and a movable union therein, of a horizontally-disposed reel spindle provided at one end with a union connected with said movable union so that said spindle will, when the reel thereon is horizontally moved, describe an arc with the said stand-pipe as a center, a reel mounted to rotate on said spindle with the union therefor, and a movable bracket supported by said stand-pipe and in which the outer end of said reel spindle has its bearing.

In testimony whereof I have affixed my signature in presence of two witnesses.

BEAUCHAMP HENRY MONTGOMERY.

Witnesses:
R. M. HALL,
WM. S. JORDAN.